US005855482A

United States Patent [19]

Remer

[11] Patent Number: 5,855,482

[45] Date of Patent: Jan. 5, 1999

[54] GRAPHIC VISUALIZATION OF CONSUMER DESIRABILITY HIERARCHY

[75] Inventor: Daniel Remer, San Rafael, Calif.

[73] Assignee: Island Graphics Corporation, Larkspur, Calif.

[21] Appl. No.: 653,934

[22] Filed: May 22, 1996

[51] Int. Cl.[6] .......... G09B 19/00; G09B 19/18

[52] U.S. Cl. .......... 434/238; 434/107

[58] Field of Search .......... 434/236, 237, 434/238, 107; 705/10, 500

[56] References Cited

U.S. PATENT DOCUMENTS 5,424,945 6/1995 Bell .......... 705/1

OTHER PUBLICATIONS

Motes, et al.. "Language, Sentence, and Structural Variations in Print Advertising." Journal of Advertising Research, vol. 32, No. 5, pp. 63–77, Sep. 1992.

Kerwin. "Media Pressured to Prove Their Ad Effectiveness." Editor & Publisher, vol. 126, No. 16, pp. 22–24, Apr. 1993.

*Primary Examiner*—Robert A. Hafer
*Assistant Examiner*—John Edmund Rovnak
*Attorney, Agent, or Firm*—Townsend and Townsend and Crew LLP

[57] ABSTRACT

The present invention provides a method for quantifying a hierarchy of consumer desirability for an object advertised or displayed in a periodical, catalog or other publication. The present invention also provides a method for altering the profile of a page to enhance consumer desirability for an object positioned on the page. In addition, the present invention is directed to a method of formulating a page profile to maximize consumer desirability for an object positioned on a page.

14 Claims, 8 Drawing Sheets

GRAPHIC VISUALIZATION OF CONSUMER DESIRABILITY HIERARCHY

BACKGROUND OF THE INVENTION

The present invention relates generally to a method for presenting an object. More specifically, the present invention relates to method for improving consumer interest in an object advertised or displayed in a publication such as a catalog or periodical.

Catalogs, periodicals and other publications are popular advertising media for promoting sales of a multitude of objects. Department stores, specialty clothing stores, linen manufacturers and holiday novelty companies routinely advertise in periodicals and catalogs in an effort to acquaint consumers with various products and thereby promote sales. While some products inherently attract a great deal of consumer interest, others have less consumer appeal and therefore generate less consumer demand.

Companies who successfully market their products through catalogs and periodicals are constantly evolving new methods to increase their revenues. One method that has proved successful in the past is to use consumer interest in those products that attract strong buyer demand to improve sales of products having less consumer demand. Other methods include: advertising in a frequently-read portion of a periodical or magazine, such as the front inside cover; altering the size of the page on which the advertisement is positioned; adding a scent or sound to an advertisement; and printing an advertisement on an insert made of heavy paper to distinguish it from other pages of the catalog or periodical.

SUMMARY OF THE INVENTION

The present invention provides a method for quantifying a hierarchy of consumer desirability for an object advertised or displayed in a periodical, catalog or other publication. The present invention also provides a method for altering the profile of a page to enhance consumer desirability for an object positioned on the page. In addition, the present invention is directed to a method of formulating a page profile to maximize consumer desirability for an object positioned on a page.

Reference to the remaining portions of the specification, including the drawings and claims, will realize other features and advantages of the present invention. Further features and advantages of the present invention, as well as the operation of various embodiments of the present invention, are described in detail below with respect to the accompanying drawings. In the drawings, like reference numbers indicate like elements.

DESCRIPTION OF THE PREFERRED EMBODIMENT

Figure 2:
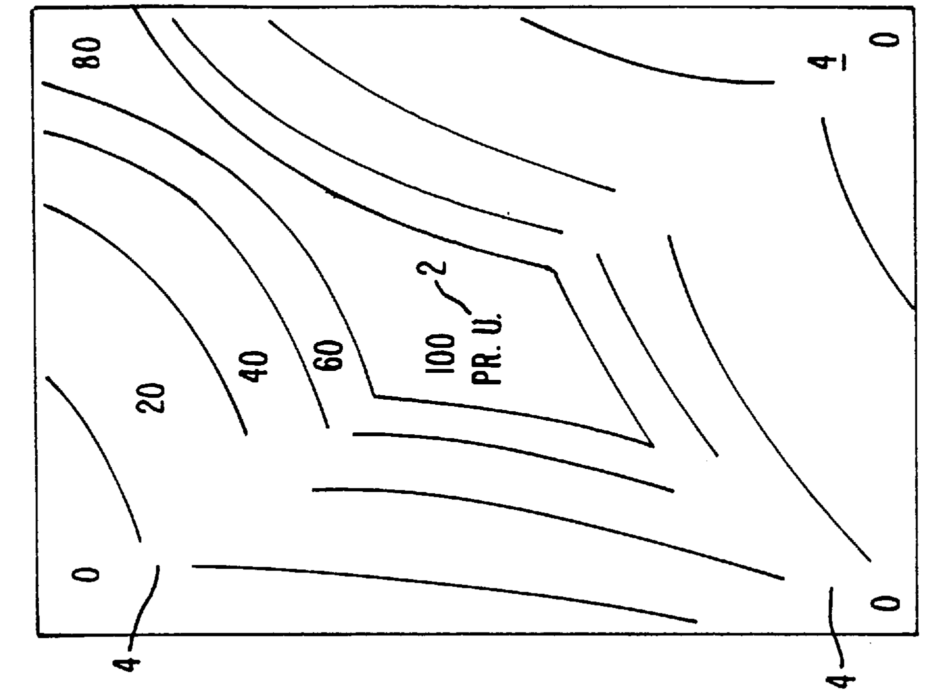
FIG. 2 is a drawing of a page profile in which the highest temperature profile regions are located in the center of the page and in one corner of the page.

The present invention provides a method of improving sales of an object advertised or displayed in a catalog, periodical or other publication. An object includes a text article, a photograph of a product, any combination of the two, or anything else that can be placed onto or into a catalog, periodical or other publication. One aspect of the invention is a method of quantifying a hierarchy of consumer desirability for an object based on its physical position on a particular page, the physical location of the page in relation to other pages of the publication, and the temperature profile of the page.

A first step in quantifying a hierarchy of consumer desirability for an object is to assess the impact on consumer desirability of location of the page in relation to other pages in the publication. It is generally known that the pages in the front portion of a publication are more frequently-read than pages located towards the end of the publication. Consequently, an object positioned on a page near the front of a publication has more consumer desirability than an object advertised on a page near the back that the reader never sees.

The impact of page location on consumer desirability for an object may be analyzed using marketing and sales data. For example, one month a company may place an advertisement for an object in a particular position on a particular page, and the next month the company may place the same advertisement in the same position on a different page. A comparison of sales figures for the two months is indicative of the relative impact of page location on consumer desirability for the object.

When deciding on which page of a publication an object should be positioned, it is advantageous to study the group to which the object is targeted so that the object may be strategically positioned in the portion of the publication the group generally reads first. In some instances, for example, the target group may generally read a publication from back to front, rather than front to back. When targeting such a group, it is advantageous to position the target object on a page near the back of the publication, rather than the front.

After assessing the physical location of the page, the object value of the page should be assessed. Object value of a page refers to the consumer desirability of a product due to its nature and position on the page. Thus, one factor pertinent to the inquiry is the physical position of the object on the page.

The impact of object position on consumer desirability for an object may be analyzed using marketing and sales data. For example, one month a company may place an advertisement for an object in a particular position on a particular page, and the next month the company may place the same advertisement in a different position on the same page. A comparison of sales figures for the two months is indicative of the relative impact of page position on consumer desirability for the object.

Another factor used in assessing the object value of a page is the independent value of the object. Independent value refers to the consumer appeal for an object by virtue of its very nature, removed from the advertising environment of the publication. Some products inherently attract a great deal of consumer interest and therefore generate a high level of consumer desirability. Others have less inherent consumer appeal and therefore generate less consumer desirability. An object which inherently generates a high level of consumer desirability, regardless of its position on a page or the location of that page with respect to other pages in a publication, has a high independent value. An object which does not inherently generate a high level of consumer desirability, and therefore depends largely on page position and page location, has a low independent value.

A third factor used to assess the object value of a page is the value of the object in relation to other objects on the page. This is known as object synergism. Some objects may demonstrate a synergistic effect when positioned on a page with other objects. For example, the sales performance of an object which is a poor seller when positioned alone on a page may improve when the object is positioned with other synergistic objects.

The impact of object synergism on consumer desirability for an object may be analyzed using marketing and sales data. For example, one month a company may place an advertisement for an object in a particular position on a particular page of a publication. The next month the company may place an advertisement in the same position on the same page, but modify the advertisement to include the original object as well as potentially synergistic objects. A comparison of sales figures for the two months is indicative of the relative impact of object synergism on consumer desirability for the object.

Once the location of the page and the object value of the page have been assessed, the temperature profile of the page may be quantified by direct reference to the page location and object value. Temperature profile is a visual representation of the consumer desirability of object positions on a particular page. Positions which tend to spark a high degree of consumer desirability for an object, and hence enhance sales of that object, are known as high temperature profile regions. Positions which spark little consumer desirability for an object, and hence have little or no positive effect on sales of the object, are known as low temperature profile regions.

Temperature profile is quantified in terms of profile units, abbreviated "pr.u.," which range in intensity from 0 to 100. Zero denotes the lowest possible temperature profile, or lowest level of consumer desirability, and 100 denotes the highest temperature profile, or highest level of consumer desirability. Profile units 1–99 represent gradations of the two extremes. Typically, a region with a temperature profile less than 50 pr.u. is considered a low temperature profile region, and a region with a temperature profile greater than 50 pr.u. is considered a high temperature profile region.

A region on a page may have a temperature profile, as may a page itself. As used herein, the temperature profile of a page may be denoted by the term "page profile." Temperature profiles pertaining to particular regions are denoted as such.

Figure 1:
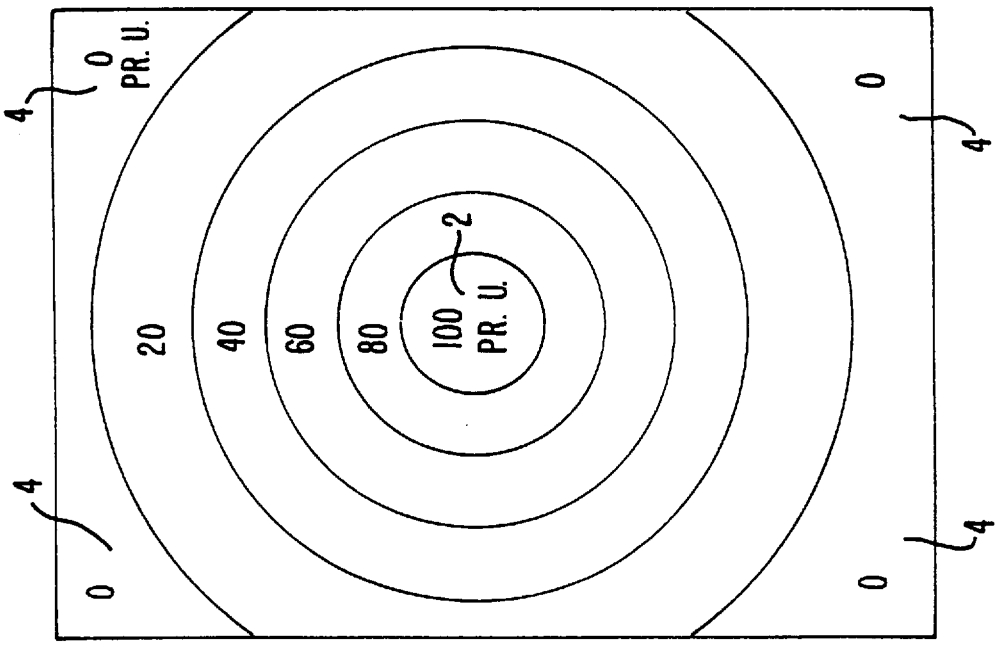
FIG. 1 is a drawing of a page profile in which the highest temperature profile region is located in the center of the page.

FIG. 1 illustrates a typical page profile. The highest temperature profile region 2 is located in the center of the page and is denoted by the measurement "100 pr.u." The lowest temperature profile regions 4 are located at the four corners of the page and are each denoted by the measurement "0 pr.u." The reader will understand that it is advantageous to maximize the use of high temperature profile regions on a particular page. Consequently, in FIG. 1, the preferred object position is in the center of the page, the highest temperature profile region.

FIG. 2–FIG. 6 illustrate temperature profiles which represent the hierarchy of desirability for a particular object on a particular page. FIG. 2 illustrates a temperature profile of a page in which the highest temperature profile regions 2 are located in the center and in one corner of the page. The remaining three corners are low temperature profile regions 4.

Figure 3:
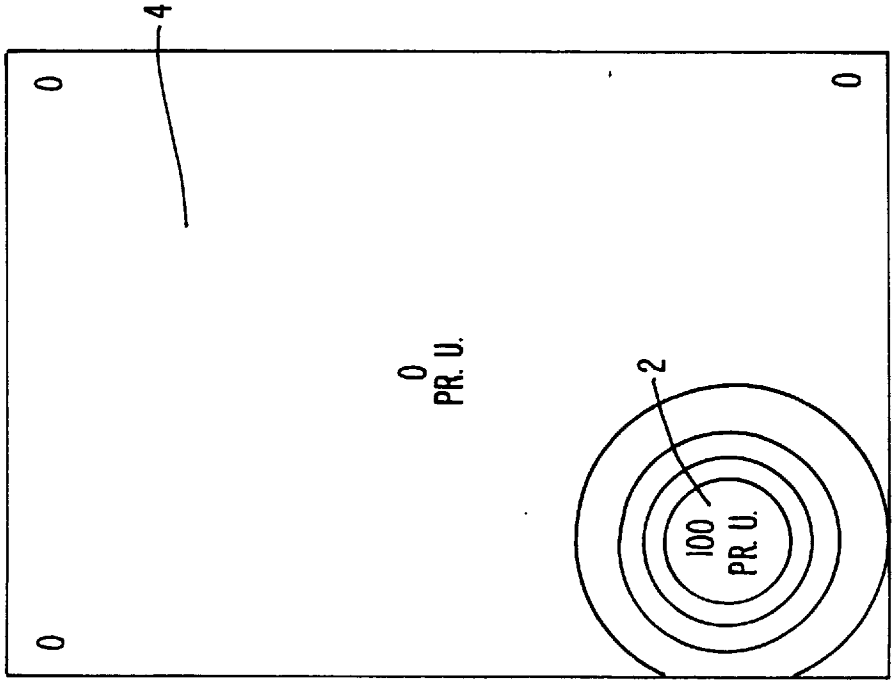
FIG. 3 is a drawing of a page profile in which the highest temperature profile region is a circular region located adjacent to one corner of the page.

FIG. 3 illustrates a page profile in which the highest temperature profile region 2 is a circular region located adjacent to one corner of the page. The remainder of the page is a low temperature profile region 4.

Figure 4:
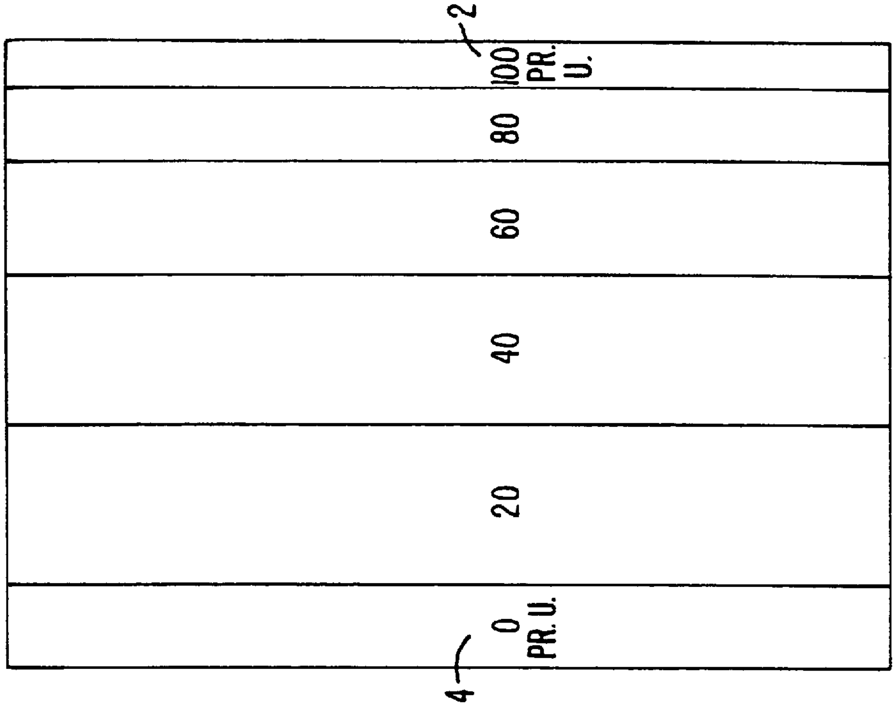
FIG. 4 is a drawing of a page profile in which the highest temperature profile region is a rectangular region located along one edge of the page, and the lowest temperature profile region is a rectangular region located along the opposite edge of the page.

FIG. 4 illustrates a page profile in which the highest temperature profile region 2 is a rectangular region located along one edge of the page, and the lowest temperature profile region 4 is a rectangular region located along the opposite edge of the page. The temperature profile of the area between the highest temperature profile region 2 and the lowest temperature profile region 4 is incrementally graded in a pattern of parallel lines from the highest temperature profile region to the lowest temperature profile region.

Figure 5:
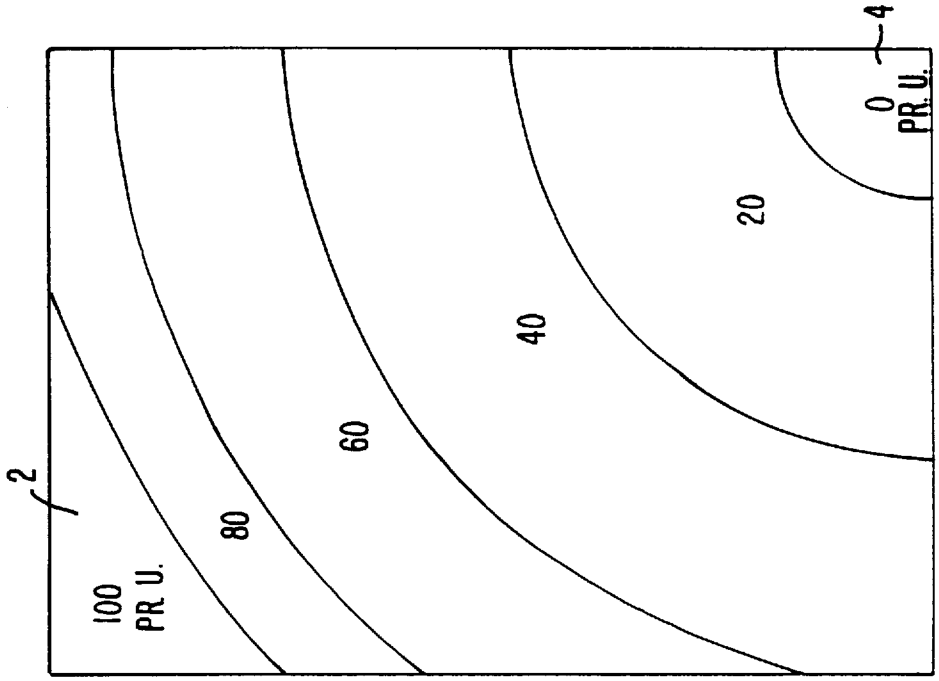
FIG. 5 is a drawing of a page profile in which the lowest temperature profile region is an arc-shaped region located in one corner of the page, and the highest temperature region is a reverse arc-shaped region located in the opposite corner of the page.

FIG. 5 illustrates a page profile in which the lowest temperature profile region is an arc-shaped region in one corner of the page, and the highest temperature region is a reverse arc-shaped region located in the opposite corner of the page. The temperature profile of the area between the highest temperature profile region 2 and the lowest temperature profile region 4 is incrementally graded in an arc-shaped pattern from the highest temperature profile region to the lowest temperature profile region.

Figure 6:
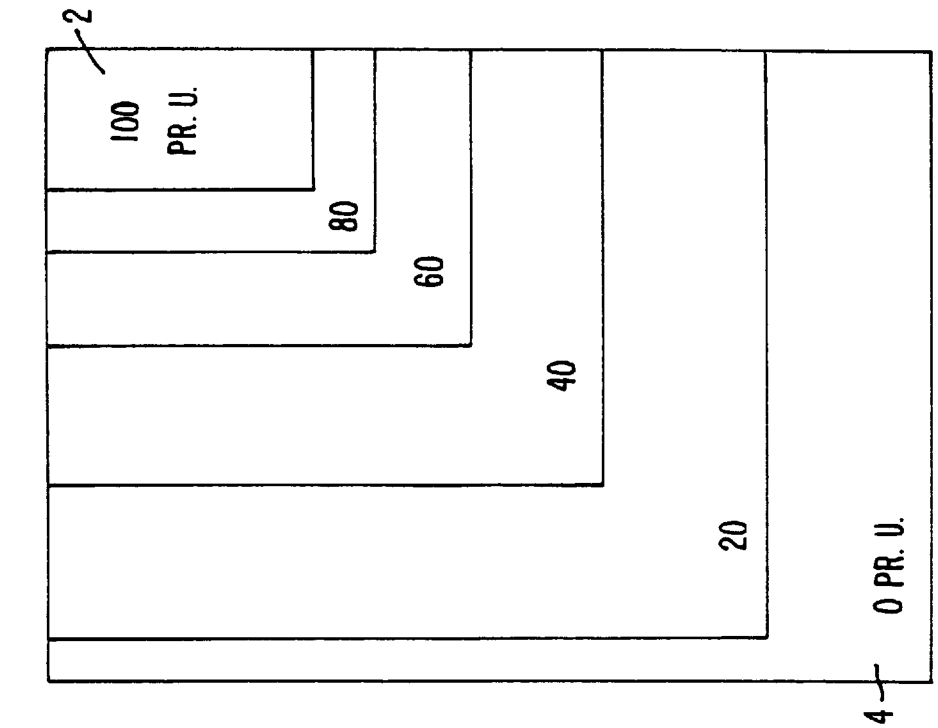
FIG. 6 is a drawing of a page profile in which the highest temperature profile region is located in one corner of the page, and the lowest temperature profile regions are located in the remaining three corners of the page.

FIG. 6 illustrates a page profile in which the highest temperature profile region 2 is located in one corner of the page, and the lowest temperature profile regions 4 are located in the remaining three corners of the page. The temperature profile of the area between the highest and lowest temperature profile regions is incrementally graded.

The present invention is also directed to a method of altering a page profile to enhance consumer desirability for an object positioned on the page. Often, companies expend large sums of money on advertisements that generate little consumer desirability for the advertised object. This aspect of the invention is directed to altering such ineffective advertisements by improving consumer desirability, and hence sales, of the advertised object.

To perform this aspect of the invention, a hierarchy for consumer desirability must be established as set forth above.

Thus, the page location is assessed, the object value of the page is assessed and the temperature profile page is quantified. Then, an object is positioned on the page, thereby altering the temperature profile. The degree of alteration depends on the independent value of the object positioned on the page, a page profile of the page on which the object is positioned, and the particular region of the page on which the object is positioned.

Figure 7:
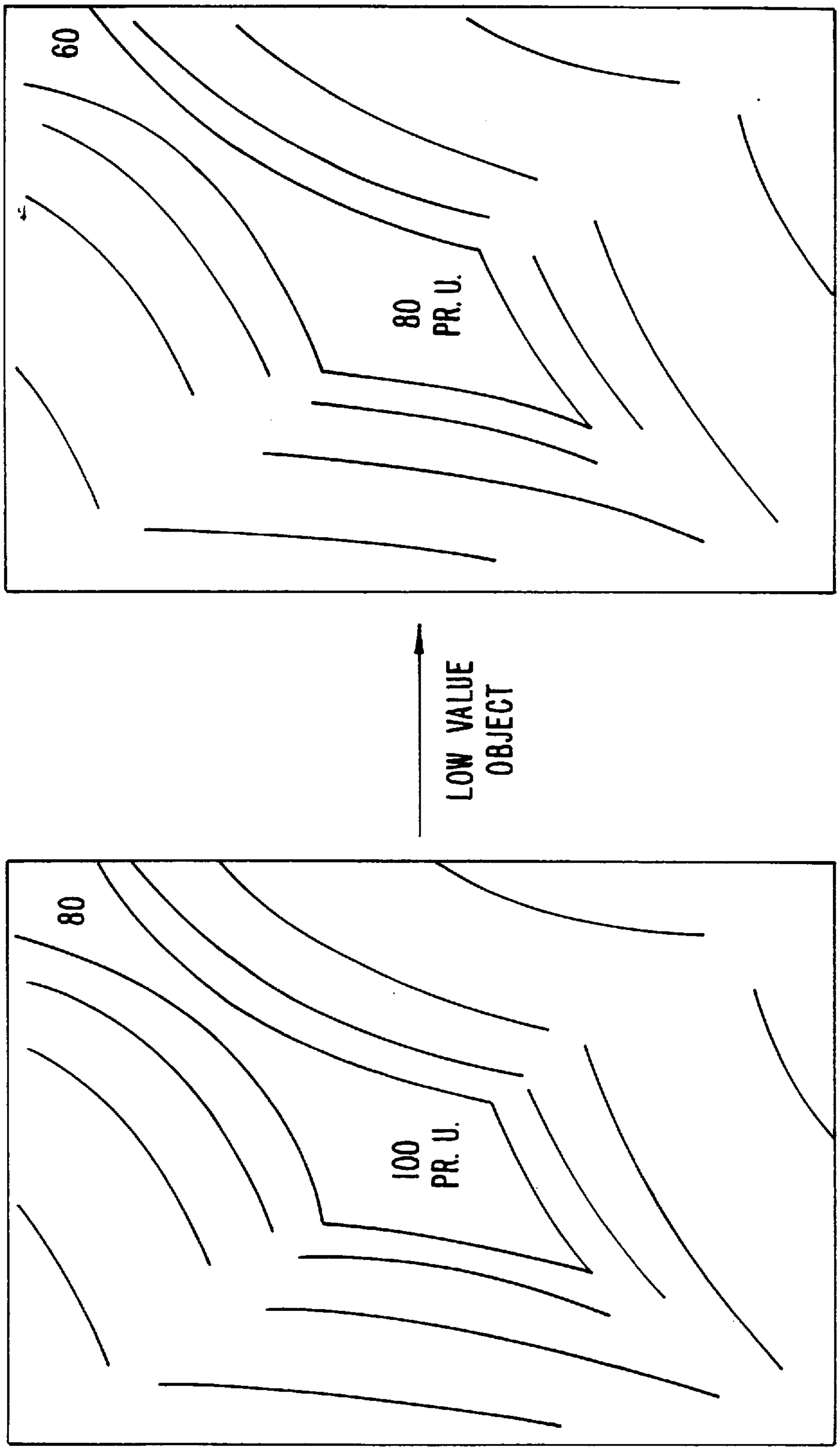
FIG. 7 is a drawing which illustrates how adding a low value object to the high temperature profile region of FIG. 3 alters the page profile of FIG. 3.
Figure 8:
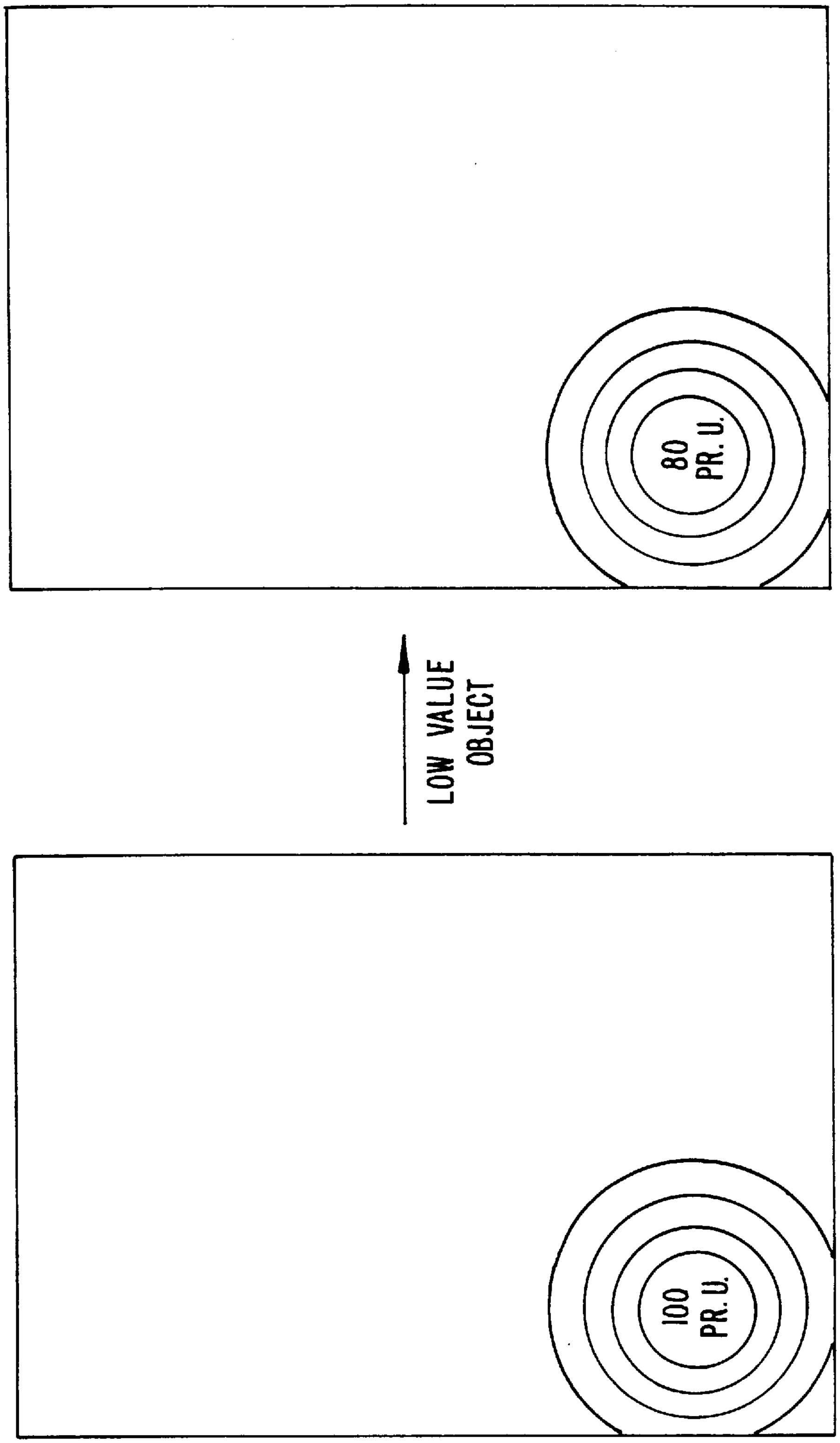
FIG. 8 is a drawing which illustrates how adding a low value object to the high temperature profile region of FIG. 2 alters the page profile of FIG. 2.
Figure 11:
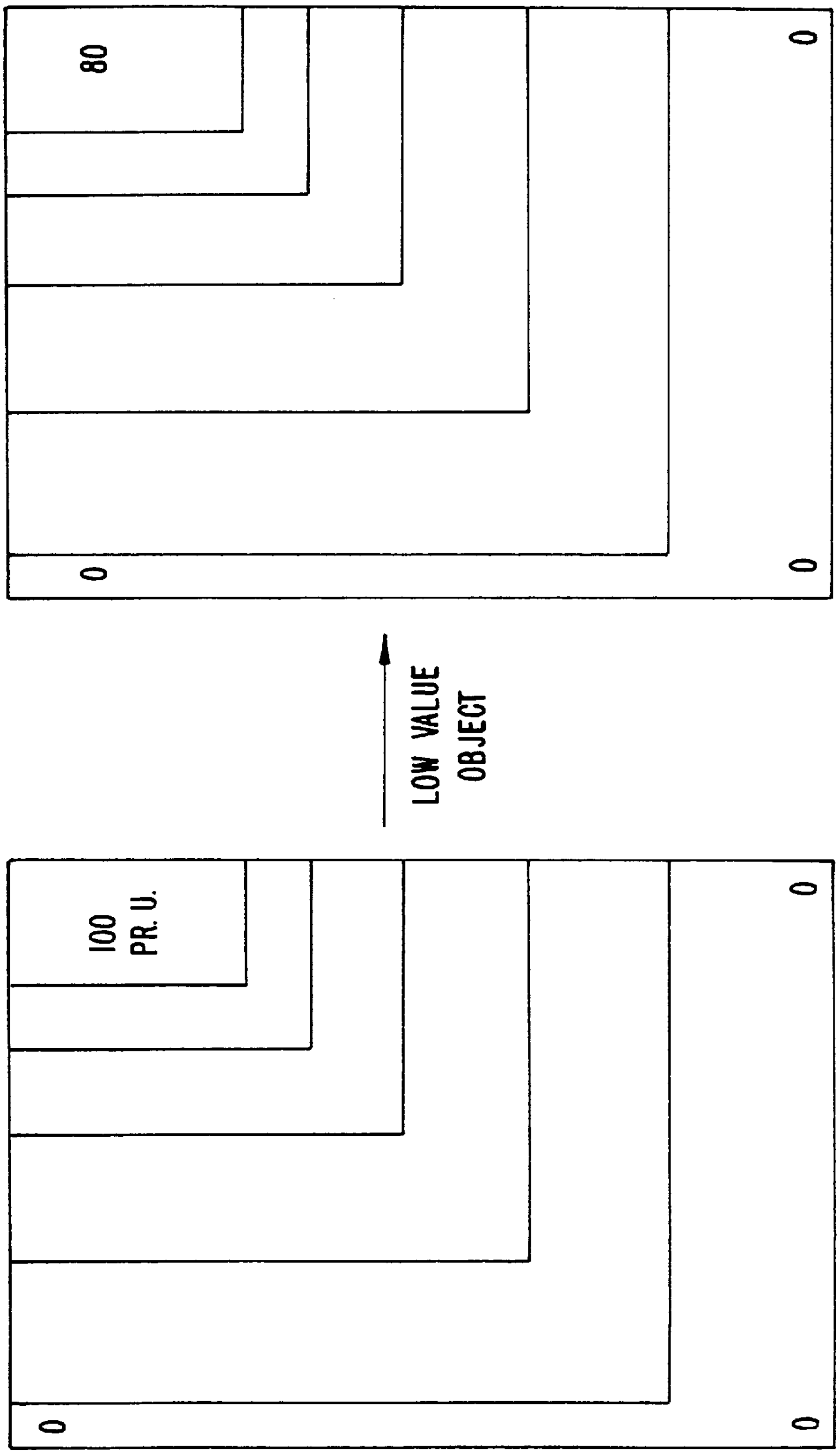
FIG. 11 is a drawing which illustrates how adding a low value object to the high temperature profile region of FIG. 6 alters the page profile of FIG. 6.

For example, a low value object may be placed in a high temperature profile region, thereby increasing the consumer desirability for the object by virtue of its position in the page. Placement of a low value object in a high temperature region causes a net "cooling" effect on the high temperature profile region, thereby slightly lowering the temperature profile. The effect is somewhat analogous to adding an ice cube to a hot beverage, thereby slightly lowering the overall temperature of the beverage. FIG. 7, FIG. 8 and FIG. 11 illustrate this phenomenon.

FIG. 7 illustrates the effect of positioning a low value object in the high temperature profile region 2 of FIG. 3. The result is increased consumer desirability for the low value object and a slight decrease in the temperature profile of the high temperature profile region 2, for example from 100 pr.u. to 80 pr.u. in one portion of the region, and from 80 to 60 pr.u. in another portion of the region. As the reader will appreciate and as indicated in FIG. 7, other aspects of the temperature profile are also altered as a result of the positioning of the low value object in the high temperature profile region.

FIG. 8 illustrates the effect of positioning a low value object in the high temperature profile region 2 of FIG. 2. The result is increased consumer desirability for the low value object and a slight decrease in the temperature profile of the high temperature profile region 2, for example from 100 pr.u. to 80 pr.u. in one portion of the region. As the reader will appreciate other aspects of the temperature profile are also altered as a result of the positioning of the low value object in the high temperature profile region.

FIG. 11 illustrates the effect of positioning a low value object in the high temperature profile region 2 of FIG. 6. The result is increased consumer desirability for the low value object and a slight decrease in the temperature profile of the high temperature profile region 2, for example from 100 pr.u. to 80 pr.u. in one portion of the region. Again, as the reader will appreciate, other aspects of the temperature profile are also altered as a result of the positioning of the low value object in the high temperature profile region.

Figure 9:
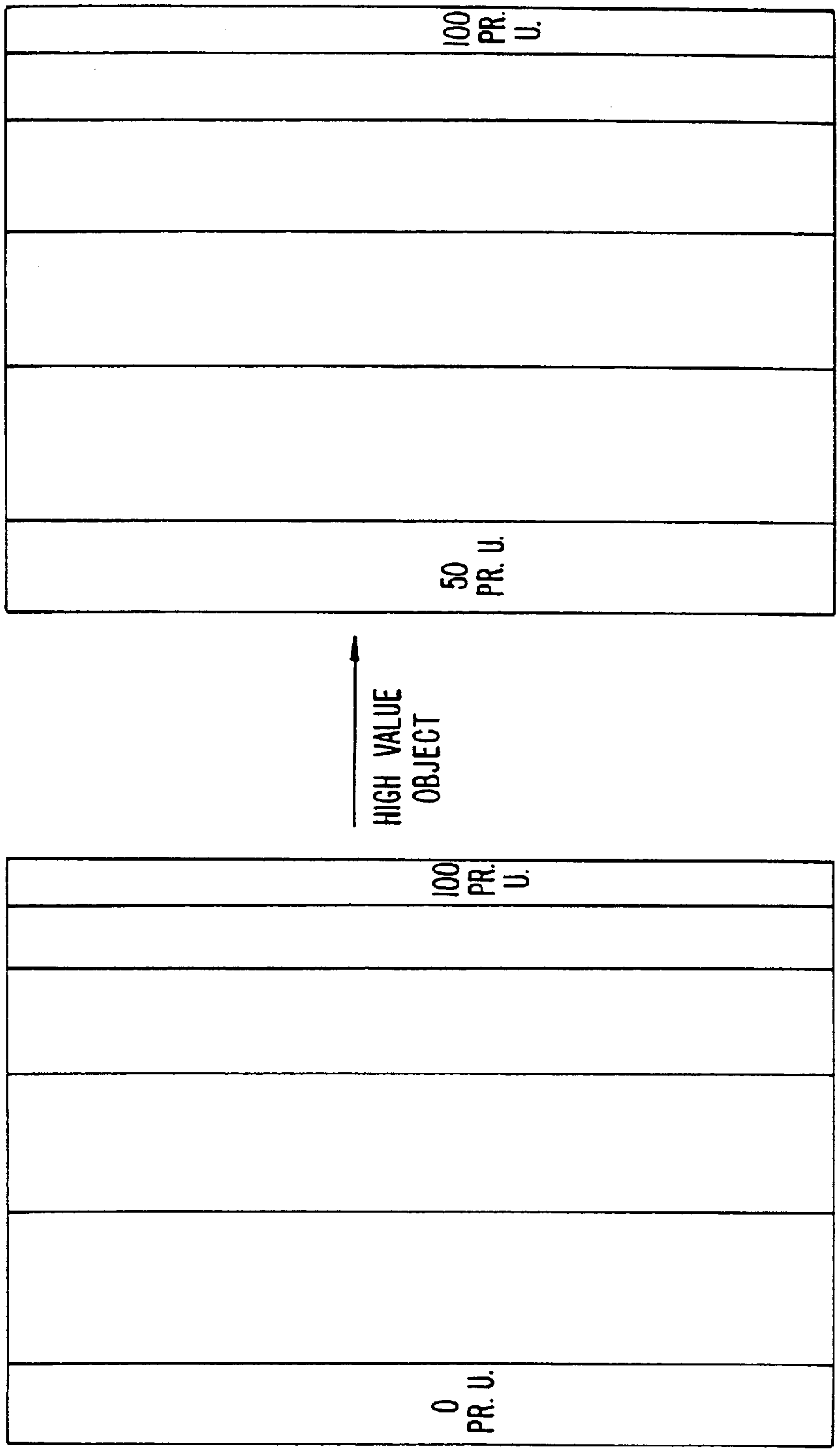
FIG. 9 is a drawing which illustrates how adding a high value object to the low temperature profile region of FIG. 4 alters the page profile of FIG. 4.
Figure 10:
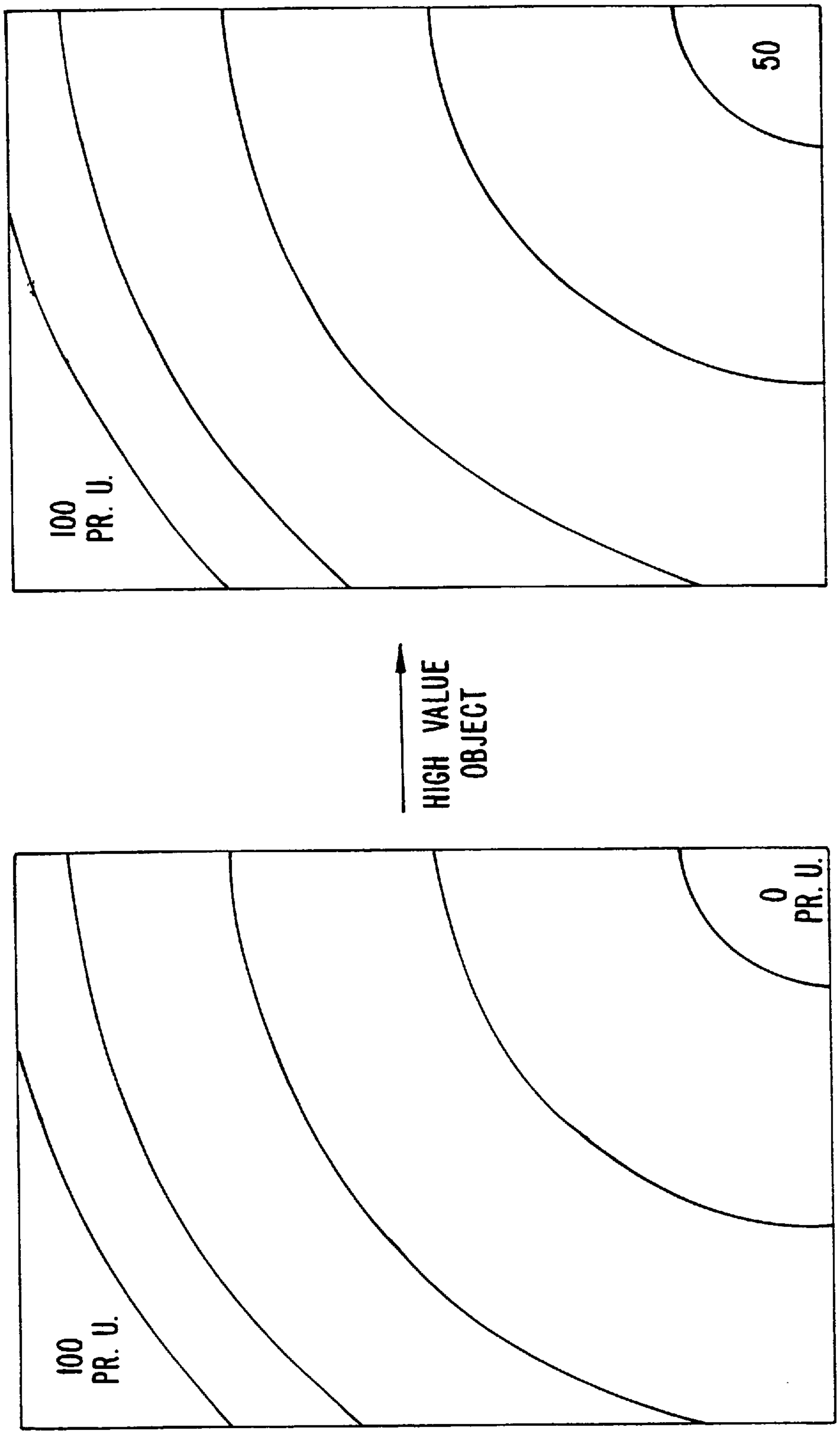
FIG. 10 is a drawing which illustrates how adding a high value object to the low temperature profile region of FIG. 5 alters the page profile of FIG. 5.

The temperature profile can also be altered by positioning a high value object in a low temperature profile region. The overall effect is to "warm" the low temperature profile area, thereby increasing the temperature profile, and hence consumer desirability, of the page as a whole. The phenomenon is much the same as adding a hot beverage to a cold one. FIG. 9 and FIG. 10 are illustrative.

FIG. 9 illustrates the effect of positioning a high value object in the low temperature profile region 4 of FIG. 4. The result is an increase in the temperature profile of the low temperature profile region 4, for example from 0 pr.u. to 50 pr.u. Likewise, FIG. 10 illustrates the effect of positioning a high value object in a low temperature profile 4 region of FIG. 5. Again, the effect is an increase in the temperature profile of the low temperature profile region 4, for example from 0 pr.u. to 50 pr.u. in one portion of the region. Because a high value object inherently has a high level of consumer desirability, placement of the high value object in a low temperature profile region may have little effect on its consumer desirability.

The above examples illustrate only a few of the ways in which a temperature profile may be altered. As the reader will appreciate, a temperature profile may be altered by positioning any object, regardless of its independent value, in any region, regardless of its temperature profile.

The present invention may also be used to formulate a page profile to maximize consumer desirability for a particular product. This aspect of the invention is directed to the situation where one essentially has a blank publication and must determine where in that publication an object should be positioned in order to maximize consumer desirability, and hence sales, of the object.

To perform this aspect of the invention, one must establish a hierarchy for consumer desirability as set forth above, and then use the hierarchy as a tool to formulate a page profile. For example, if the hierarchy indicates that a particular object position on a particular page is favorable and tends to positively affect sales, a company may choose to similarly position an object. The converse is also true. If the hierarchy indicates that a particular object position on a particular page is unfavorable and has no effect or a negative effect on sales, a company may avoid similar positioning an object.

The present invention may also be employed by a publisher of a magazine, catalog, or other publication to enhance the desirability of the publication among advertisers, promoters, and others who promote products and/or services in various publications. Many publications generate revenue by selling advertising space. If a prospective advertiser believes that an ad in a particular publication will be seen by a category of consumer sought by the advertiser, the advertiser will elect to place an ad in the particular publication. By practicing the present invention, the publisher of the particular publication can further enhance the consumer desirability of the ad, thereby further increasing the likelihood that the ad will be seen by the group of consumers sought by the advertiser.

To perform this aspect of the invention, one must establish a hierarchy for consumer desirability for the specified object as set forth above, and then use the hierarchy as a tool to formulate a optimal page location and page profile for the object. For example, if the hierarchy indicates that a particular page location/page profile combination is optimal in that it tends to positively affect sales for the specified object, then the publisher may offer that particular page location/object position to the advertiser at a premium price. The converse is also true. If the hierarchy indicates that a particular page location/page profile combination is suboptimal in that it has little or no effect effect on sales for the specified object, then the publisher may offer that particular page location/object position to the advertiser at a discount. In this manner the publisher can employ the present invention to increase advertising sales volume by making the publication desirable to more advertisers, or to maximize sales revenue for an expected advertising sales volume by deriving an optimum premium/discount mix.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A method for increasing a consumer desirability quantification for an object positioned on a page of a publication having a plurality of pages, comprising the steps of:

evaluating each of a plurality of positions of said page in said publication;

assigning an object value to each of a plurality of page layouts for said page;

quantifying a temperature profile of said page; and altering said temperature profile of said page by a known amount to increase the consumer desirability quantification.

2. The method of claim 1, wherein said step of assigning an object value to each of a plurality of page layouts further comprises:

measuring a consumer response for each of a plurality of positions for a first object on said page;

quantifying an independent value of said first object to consumers;

quantifying a relative value of said first object in relation to a second object displayed on said page.

3. The method of claim 2, wherein said step of altering the temperature profile of said page by a known amount further comprises positioning said first object in a high temperature profile region of said temperature profile.

4. The method of claim 3, wherein said first object has a low independent value and said step of positioning said first object in a high temperature profile region of said temperature profile causes said high temperature profile region to reduce in temperature by a known amount.

5. The method of claim 3, wherein said first object has a high independent value and said step of positioning said first object in a high temperature profile region of said temperature profile causes said high temperature profile region to increase in temperature by a known amount.

6. The method of claim 2, wherein said step of altering the temperature profile of said page by a known amount further comprises positioning said first object in a low temperature region of said temperature profile.

7. The method of claim 6, wherein said first object has a high independent value and said step of positioning said first object in a low temperature profile region of said temperature profile causes said low temperature profile region to increase in temperature by a known amount.

8. The method of claim 6, wherein said first object has a low independent value and said step of positioning said first object in a low temperature profile region of said temperature profile causes said low temperature profile region to decrease in temperature by a known amount.

9. The method of claim 2, wherein said step of altering the temperature profile of said page by a known amount further comprises:

positioning said first object in a high temperature profile region of said temperature profile; and positioning said second object in a low temperature profile region of said temperature profile.

10. The method of claim 8, wherein said first object has a low independent value and said step of positioning said first object in a high temperature profile region of said temperature profile causes said high profile temperature region to reduce in temperature by a known amount.

11. The method of claim 9, wherein said first object has a high independent value and said step of positioning said first object in a high temperature profile region of said temperature profile causes said high profile temperature region to increase in temperature by a known amount.

12. The method of claim 9, wherein said second object has a high independent value and said step of positioning said second object in a low temperature profile region of said temperature profile causes said low profile temperature region to increase in temperature by a known amount.

13. The method of claim 9, wherein said second object has a low independent value and step of positioning said second object in a low temperature profile region of said temperature profile causes said low temperature profile region to decrease in temperature by a known amount.

14. A method for increasing a value representing a consumer desirability for a first object displayed on a page of a publication having a plurality of pages, the method comprising the steps of:

quantifying a hierarchy of consumer desirability for the first object to produce the value;

formulating a temperature profile for the plurality of pages;

quantifying a relative value of the first object to any other objects displayed on the plurality of pages; and thereafter associating the first object with a page position on a particular one of the plurality of pages, responsive to said temperature profile of said particular one page, and with a selected one of said other objects to produce an enhanced value for the consumer desirability of the first object such that the value after said associating step is greater than the value.

* * * * *